July 21, 1959 H. V. NUTTALL ET AL 2,896,091

MAGNETIC AMPLIFIER DIGITAL COMPARISON CIRCUIT

Filed May 8, 1956

HUBBERT V. NUTTALL,
JOHN E. RICHARDSON,
INVENTORS

BY [signature]

ATTORNEY

United States Patent Office 2,896,091

Patented July 21, 1959

2,896,091

MAGNETIC AMPLIFIER DIGITAL COMPARISON CIRCUIT

Hubert V. Nuttall, Culver City, and John E. Richardson, Los Angeles, Calif., assignors to Hughes Aircraft Company, Culver City, Calif., a corporation of Delaware Application May 8, 1956, Serial No. 583,577

6 Claims. (Cl. 307—88)

This invention relates generally to magnetic ampifiers and more particularly to a digital comparison circuit employing magnetic amplifiers.

In the digital computer art and particularly with respect to the use of such computers in the automation field it becomes necessary in many instances to compare signals. For example, a command signal from the programmer may have to be compared with signals from the table or other movable device containing a work piece, the movable tool, or a measuring instrument to determine whether further operations need be performed upon the work piece. In performing this function the two signals are brought together, compared, and an output signal produced depending upon a predetermined relationship between the two signals. In the prior art this function has usually been performed by circuits employing vacuum tubes.

While in general circuits employing vacuum tubes are quite reliable they present a number of disadvantages, the most obvious of these is that inasmuch as vacuum tubes are employed such tubes are subject to normal failure. Further, they are of relatively fragile construction and may present a serious problem in maintenance of a relatively large system. Furthermore due to the relatively large size of these tubes they present a serious problem in packaging and in other disposition of components within an over-all system.

Accordingly an object of the present invention is to provide a digital comparison circuit which is more reliable, economical and uses fewer elements than comparable vacuum tube circuits.

Another object is to provide a digital comparison circuit utilizing magnetic amplifiers as basic components thereof.

A further object is to provide a magnetic amplifier circuit for performing the reciprocal of the exclusive "or" function of binary logic.

A still further object of the present invention is to provide a digital comparison circuit of relatively small size which requires little or no maintenance.

A digital comparison circuit in accordance with the present invention includes first and second magnetic amplifiers, each having input and output circuits. The input circuits are connected in series opposition while the output circuits are connected series aiding. Means for applying a plurality of control signals is connected to the input circuits. Output signals are produced in response to the application of the control signals only during the time the control signals have predetermined relationships, that is when identical control signals are applied to each of the inputs simultaneously or when no control signals whatsoever are applied.

The novel features of the present invention are set forth in particularity in the appended claims. Other and more specific objects of the invention will become apparent from a consideration of the following description taken in connection with the accompanying drawing illustrating by way of example only a preferred embodiment of the present invention in which:

Figure 1:
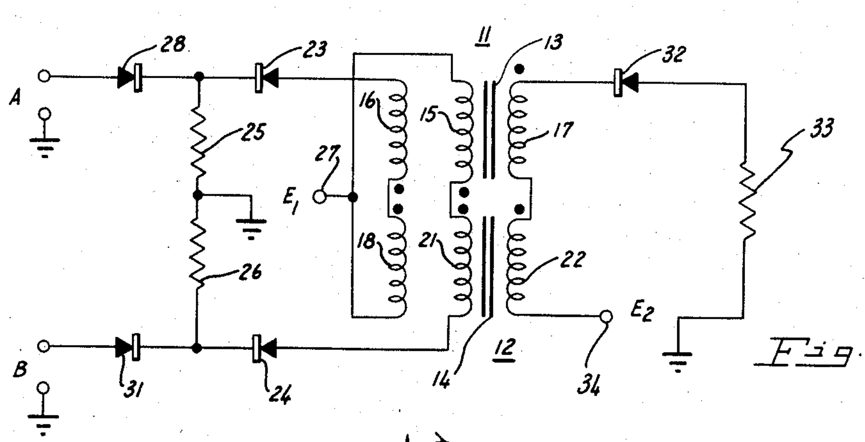
Fig. 1 is a schematic circuit diagram of the preferred embodiment of a digital comparison circuit in accordance with the present invention.

Referring now to the drawing and more particularly to Fig. 1 the digital comparison circuit therein is shown to include two magnetic amplifiers represented generally by 11 and 12. The magnetic amplifiers include cores 13 and 14 respectively. Core 13 is shown to have three windings, 15, 16 and 17 thereon. Windings 15 and 16 are input windings while 17 represents an output winding. Likewise, core 14 is shown to have three windings, 18, 21 and 22, 18 and 21 being the input windings and 22 the output winding. As indicated by the polarity marking on each of the windings, windings 15 and 21 are connected in series opposition with each other and windings 16 and 18 are also connected in like series opposition. Furthermore winding 15 is connected to winding 18 in such a manner that all of the input windings of magnetic amplifiers 11 and 12 are connected in series opposition. It is to be further noted that output windings 17 and 22 are connected series aiding.

Unidirectional current flow devices such as diodes 23 and 24 are connected to input windings 16 and 21 respectively. Connected in series between the cathodes of diodes 23 and 24 are resistors 25 and 26 respectively. The common junction point of resistors 25 and 26 is connected to a point of fixed potential such as ground. Also connected between the cathodes of diodes 23 and 24 and input terminals A and B are unidirectional current flow devices such as diodes 28 and 31 respectively. It will be noted that diodes 23 and 24 are poled opposite to diodes 28 and 31. A source of energizing potential designated by $E_1$ is connected to terminal 27 which is, it will be noted, also the junction between input windings 15 and 18. This provides two parallel paths for current flow through the input windings.

A unidirectional current flow device such as diode 32 is connected in series with a load impedance element such as resistor 33 between the polarity marked terminal of output winding 17 and ground. A second source of energizing potential designated by $E_2$ is connected to terminal 34.

Figure 2:
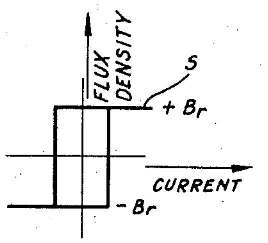
Fig. 2 is a graph illustrating the characteristic curve of one type of magnetic core which may be utilized in the digital comparison circuit of the present invention.

Referring now more particularly to Fig. 2 which illustrates the characteristic of a magnetic core having a substantially rectangular hysteresis loop and in which the abscissa represents current and the ordinate flux density, it will be noted that a core having a characteristic of this type has two flux levels or states of remanence shown as $+B_r$ and $-B_r$ on Fig. 2. The hysteresis loop as shown in Fig. 2 is used for purposes of clarity in discussion only; it is to be expressly understood that a magnetic core having other hysteresis loops may be used without departing from the spirit or scope of this invention.

It is well known in the prior art that if a current of proper polarity is passed through a winding which has been wound upon a magnetic core and at the same time voltage is maintained across the winding for a given period of time the flux state of the core may be caused to change from $+B_r$ to $-B_r$ or from $-B_r$ to $+B_r$ as the case may be.

An extensive discussion of this phenomenon including the pertinent mathematics may be found in Patent 2,719,885 issued to R. A. Ramey, Jr., October 4, 1955, and filed July 20, 1951. It is this phenomenon upon which the magnetic amplifier is based.

As is well known in the art a certain amount of current is required to flow in a winding wound upon a magnetic core of the type above described to cause the flux within the magnetic core to change from one state of remanence to another irrespective of the applied voltage. This amount of current is represented on Fig. 2 by the distance between the ordinate and the vertical portion in either direction of the hysteresis loop.

Figure 3:
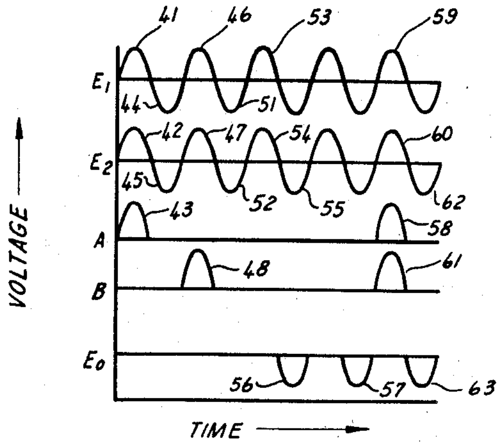
Fig. 3 is a graph illustrating waveforms taken at various points throughout the circuit of Fig. 1.

In discussing the operation of the circuit in Fig. 1 reference is now made to Fig. 3 wherein the abscissa represents time and the ordinate voltage. Curves $E_1$ and $E_2$ where taken by measuring between terminals 27 and 34 respectively and ground. The periodically recurring waves as shown will, under proper conditions, cause the flux state within cores 13 and 14 to change continuously from one state of remanence to the other. As is shown on Fig. 3 the sources of periodically recurring waves $E_1$ and $E_2$ have the same frequency and phase relationships. The curves A and B were taken by measuring across input terminals A and B of Fig. 1. Curve $E_0$ was taken by measuring across load resistor 33.

Before discussion of the operation of the circuit of Fig. 1 it will first be assumed that periodically recurring waves of voltage such as shown at $E_1$ and $E_2$ on Fig. 3 are applied to terminals 27 and 34 respectively of Fig. 1. The windings upon cores 13 and 14 are wound in such a manner as to cause the polarity of voltages appearing thereacross to be as indicated by the polarity markings. If current enters an unmarked terminal of one of the windings the flux within cores 13 and 14 will be caused to reset, that is go from $+B_r$ to $-B_r$ whereas if current is allowed to enter a polarity marked terminal of one of the windings the flux within cores 13 and 14 is caused to read out, that is, go from $-B_r$ to $+B_r$. It is to be assumed further that each of the windings have enough turns to just support the voltage which is applied by sources of potential $E_1$ and $E_2$ if the flux level of cores 13 and 14 is to change by $2B_r$. One further assumption is that cores 13 and 14 are initially in their $+B_r$ state.

Assuming as a first example of operation that sources of potential $E_1$ and $E_2$ are positive as shown at 41 and 42 on Fig. 3 this causes terminals 27 and 34 to be positive with respect to ground. While this state exists diode 32 is back-biased and diodes 23 and 24 are forward-biased tending to cause current to flow through both parallel paths that is, through windings 15, 21, diode 24 and resistor 26, and through windings 18, 16, diode 23 and resistor 25 to ground. However since a control signal 43 is applied at this time to input terminal A diode 28 is also forward-biased. Control signal 43 is somewhat larger in amplitude than is positive portion 41 of energizing source $E_1$ as is indicated on Fig. 3. Therefore diode 23 is back-biased by control signal 43 overcoming positive half cycle 41 and no current can flow through that parallel path including windings 16 and 18. The only current now flowing is through windings 15 and 21 of amplifiers 11 and 12. Since current is entering an unmarked terminal of winding 15 core 13 will be reset. Since current is entering a marked terminal of winding 21 the flux within core 14 is caused to move to the point of saturation S as shown in Fig. 2.

On the succeeding half cycles 44 and 45 of $E_1$ and $E_2$ respectively diodes 23 and 24 will be back-biased by negative portion 44 of $E_1$ and no current will flow through the parallel paths formed by the input windings. However diode 32 in the output windings will be forward-biased and current will tend to flow in the output circuit. Since core 13 was reset during the preceding half cycle of $E_1$ and current is now entering winding 17 at a marked terminal the flux within core 13 will be caused to read out. Therefore, the entire voltage presented by source $E_2$ will appear across winding 17 and no output signal will be produced across resistor 33.

If on the succeeding half cycles 46 and 47 of $E_1$ and $E_2$ respectively a control signal 48 is applied to input terminal B a similar series of events will occur. However in this instance diode 24 will be back-biased and current will flow through windings 18 and 16. Since current is entering an unmarked terminal of winding 18 the flux within core 14 resets while the flux within core 13 moves to the point of saturation S since current is entering a marked terminal of winding 16. On the succeeding half cycles 51 and 52 of $E_1$ and $E_2$ respectively the flux within core 14 is caused to read out since current is entering a marked terminal of winding 22. Therefore the entire voltage of source $E_2$ appears across winding 22 and no output signal is produced across resistor 33.

Therefore, it is seen that if the control signals appearing upon input terminals A and B are non-identical no output signals will appear across load resistor 33. However if the input signals appearing at terminals A and B are identical during positive half cycles of $E_1$ and $E_2$ output signals will be produced across load resistor 33 during the succeeding half cycles of $E_1$ and $E_2$. This is exemplified by the succeeding half cycles 53 and 54 of sources $E_1$ and $E_2$. During the appearance of these half cycles no control signals appear at terminals A and B. Therefore, in a negative sense the signals appearing at terminals A and B are identical. Since this is the case diodes 23 and 24 are both forward-biased and current flows through both parallel paths of the input circuit. Since current is entering an unmarked terminal of winding 15 and a marked terminal of winding 16 on core 13 the magnetizing forces present in each of these windings cancel each other and core 13 is left in its $+B_r$ state. The same situation exists with respect to windings 18, 21 and core 14. Therefore during the succeeding half cycle 55 of $E_2$ current is caused to flow into a marked terminal of windings 17 and 22. Since cores 13 and 14 are already in their $+B_r$ state, the flux therein will move to the positive saturation point S of Fig. 2 and relatively little voltage will be dropped across windings 17 and 22. Therefore an output signal will appear across load resistor 33 as shown at 56 on Fig. 3. So long as no control signals appear at terminals A and B output signals will be produced during each negative half cycle of $E_2$ as shown by output signals 56 and 57.

If at this time during positive half cycles 59 and 60 of $E_1$ and $E_2$ control signals 58 and 61 are simultaneously applied to terminals A and B respectively the following series of events occur: diodes 23 and 24 are each back-biased by their respective control signals thus opening each of the parallel paths present in the input circuit. Since current cannot flow through the input windings the flux within both cores 13 and 14 remains in its $+B_r$ state. On the negative half cycle 62 of $E_2$ an output signal is produced across load resistor 33 as shown at 63 in the manner discussed hereinabove. Therefore it is seen that during the time the control signals applied to terminals A and B are identical, that is, when either no control signals are applied to either of the input terminals or when control signals are applied simultaneously to both of the input terminals, an output signal will be produced. Therefore, it is seen that the circuit as represented in Fig. 1 performs the reciprocal of the exclusive "or" function of binary logic. This may be further represented by the binary logical equation $$(A \cdot B) + (\bar{A} \cdot \bar{B}) = E_0$$

where $\bar{A}$ and $\bar{B}$ indicate the complement of A and B respectively; the · represents the logical "and" function of Boolean Algebra; and the + represents the logical "or" function.

It is well known in the prior art that the exclusive "or" function of binary logic may be represented using the above notations as $$(\bar{A} \cdot B) + (A \cdot \bar{B})$$

It will be understood that circuit specifications for the digital comparison circuit of Fig. 1 may vary according to the design for any particular application. The following circuit specifications are included by way of example only, suitable for use with sources of potential $E_1$ and $E_2$ having a frequency of 400 cycles per second.

| | |
|---|---|
| Cores 13 and 14 | Magnetic Inc., type 5002-ID Hy Mu 80 Magnetic Core. |
| Windings 15, 16, 18 and 21 | 1,000 turns each. |
| Windings 17 and 22 | 3,000 turns each. |
| Source $E_1$ | 10 volts. |
| Source $E_2$ | 30 volts. |
| Diodes 23, 24, 28, 31 and 32 | Hughes Aircraft Company, Germanium diodes type 1N100. |
| Resistors 25, 26 and 33 | 2,000 ohms each. |

There has thus been disclosed a digital comparison circuit for performing the reciprocal of the exclusive "or" function of binary logic which utilizes magnetic amplifiers as the basic components thereof thus providing a circuit which is much more reliable than vacuum tube circuits and which require virtually no maintenance.

What is claimed is:

1. A comparator circuit for performing the reciprocal of the exclusive "or" function comprising: first and second magnetic cores having substantially rectangular hysteresis loops, each including three windings, two of said windings on each core being input windings and one an output winding, said input windings of said first and second cores being connected in series opposition and said output windings of said first and second cores being connected series aiding; energizing means connected to said input and output windings for alternately changing the flux level within said cores from one state of remanence to the other; and means connected to said input windings for applying thereto control signals, whereby an output signal is produced only during the time the applied control signals are identical.

2. A comparator circuit comprising: first and second magnetic cores having substantially rectangular hysteresis loops; first and second input windings and an output winding on said first core; third and fourth input windings and an output winding on said second core, said first and third windings being connected in series opposition and said second and fourth windings being connected in series opposition, said first winding being connected to said fourth winding, whereby all of said input windings are connected in series opposition; a source of energizing potential connected to said input and output windings for alternately changing the flux level within said cores from one state of remanence to the other; and means connected to said input windings for applying a plurality of control signals thereto for controlling the setting of the flux state of said cores, whereby an output signal is produced only during the time the control signals are identical.

3. A comparator circuit comprising: first and second magnetic cores having substantially rectangular hysteresis loops; first and second input windings and an output winding on said first core; third and fourth input windings and an output winding on said second core, said first and third windings being connected in series opposition and said second and fourth windings being connected in series opposition, said first winding being connected to said fourth winding at a common terminal; a source of energizing potential connected between said common terminal and a point of fixed potential, whereby two parallel current flow paths are provided by said first and third windings and said second and fourth windings respectively; a unidirectional current flow device connected in each of said current flow paths; and coupling means connected to each of said current flow paths for applying control signals thereto, whereby output signals are produced only during the time said control signals are alike or during the time no control signals are applied.

4. The comparator circuit as defined in claim 3 wherein said unidirectional current flow devices are diodes.

5. A comparator circuit comprising: first and second magnetic cores having substantially rectangular hysteresis loops; first and second input windings and an output winding on said first core; third and fourth input windings and an output winding on said second core, said first and third windings being connected in series opposition and said second and fourth windings being connected in series opposition, said first winding being connected to said fourth winding at a common terminal whereby two parallel current flow paths are formed by said first and third windings and said second and fourth windings respectively; first and second sources of energizing potential connected in said input and output windings, each of said potentials having the same frequency and phase relationships for alternately changing the state of flux within said cores; a diode connected in each of said current flow paths and to one of said output windings, said diodes being poled to prevent current flow through said input and output windings during concurrent half cycles of said energizing sources; and coupling means connected to each of said current flow paths for applying a plurality of control signals thereto, whereby output signals are produced during the time said control signals are alike or during the time no control signals are applied.

6. The comparator circuit as defined in claim 5 wherein said coupling means are diodes poled oppositely to said diodes connected in each of said current flow paths.

References Cited in the file of this patent

UNITED STATES PATENTS

| | | |
|---|---|---|
| 2,783,315 | Ramey | Feb. 26, 1957 |
| 2,828,477 | Lanning | Mar. 25, 1958 |
| 2,834,004 | Canepa | May 6, 1958 |